United States Patent
Oyobe et al.

(10) Patent No.: US 7,486,035 B2
(45) Date of Patent: Feb. 3, 2009

(54) POWER OUTPUT APPARATUS AND VEHICLE INCLUDING SUCH POWER OUTPUT APPARATUS

(75) Inventors: Hichirosai Oyobe, Toyota (JP); Tetsuhiro Ishikawa, Nishikamo-gun (JP); Yukihiro Minezawa, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 29 days.

(21) Appl. No.: 11/261,780

(22) Filed: Oct. 31, 2005

(65) Prior Publication Data

US 2006/0091836 A1 May 4, 2006

(30) Foreign Application Priority Data

Nov. 4, 2004 (JP) ............................. 2004-320959

(51) Int. Cl.
H02P 7/00 (2006.01)
H02P 25/30 (2006.01)
(52) U.S. Cl. ..................................... 318/149; 318/140
(58) Field of Classification Search ................. 318/149, 318/140
See application file for complete search history.

(56) References Cited

U.S. PATENT DOCUMENTS

| 5,099,186 | A | 3/1992 | Rippel et al. | |
| 6,437,535 | B1 * | 8/2002 | Sinha | 318/800 |
| 6,962,224 | B2 * | 11/2005 | Nakanowatari | 180/65.2 |
| 7,362,597 | B2 * | 4/2008 | Ishikawa et al. | 363/71 |
| 2007/0158948 | A1 * | 7/2007 | Oyobe et al. | 290/4 R |
| 2007/0171689 | A1 * | 7/2007 | Ishikawa et al. | 363/71 |
| 2007/0247770 | A1 * | 10/2007 | Ishikawa et al. | 361/47 |
| 2008/0073135 | A1 * | 3/2008 | Oyobe et al. | 180/65.4 |

FOREIGN PATENT DOCUMENTS

| EP | 1 201 485 A1 | 5/2002 |
| JP | 4-295202 | 10/1992 |
| JP | 8-126121 | 5/1996 |
| JP | 9-294399 | 11/1997 |
| JP | 2003-143897 A | 5/2003 |
| JP | 2003-153579 A | 5/2003 |
| JP | 2004-23973 A | 1/2004 |
| JP | 2004-120853 A | 4/2004 |
| JP | 2004-236424 A | 8/2004 |

OTHER PUBLICATIONS

German Language Version of German Official Letter/Communication, Appln. No. 10 2005 052 511.3 dated Aug. 21, 2007.
English Translation of German Official Letter/Communication, Appln. No. 10 2005 052 511.3 dated Aug. 21, 2007.

* cited by examiner

*Primary Examiner*—Walter Benson
*Assistant Examiner*—Erick Glass
(74) *Attorney, Agent, or Firm*—Kenyon & Kenyon LLP

(57) ABSTRACT

A first motor generator is linked to an engine and generates torque to start the engine. At time t1-t2 and time t3-t4, when current conducted to the first motor generator will exceed the upper limit value and the lower limit value due to the increase of the absolute value of a current component required to conduct alternating current across neutral points of first and second motor generators, a control device corrects a torque control value of the first motor generator such that the torque current component of the first motor generator directed to starting the engine is reduced.

10 Claims, 9 Drawing Sheets

POWER OUTPUT APPARATUS AND VEHICLE INCLUDING SUCH POWER OUTPUT APPARATUS

This nonprovisional application is based on Japanese Patent Application No. 2004-320959 filed with the Japan Patent Office on Nov. 4, 2004, the entire contents of which are hereby incorporated by reference.

BACKGROUND OF THE INVENTION

1. Field of the Invention

The present invention relates to a power output apparatus and a vehicle including such a power output apparatus. Particularly, the present invention relates to a power output apparatus that can generate alternating voltage and output the same to an external alternating current load, and a vehicle including such a power output apparatus.

2. Description of the Background Art

U.S. Pat. No. 5,099,186 discloses a motor drive and recharge system that can generate alternating current power and output the same to an external source. The motor drive and recharge system includes a battery, two motors, two inverters connected to the two motors, respectively, and an input/output port connected between the neutral points of the two motors. This motor drive and recharge system can generate alternating voltage across the neutral points of the two motors to output the generated alternating voltage from the input/output port.

In such a motor drive and recharge system, there may be a case where both the alternating current power to be provided to an external alternating current load and the power for driving the motor are requested at the same time. Particularly in the case where alternating current power is output to an external alternating current load while power-running the motor, excessive current may flow to the inverter to damage it. U.S. Pat. No. 5,099,186 provides no means for appropriately obviating such current concentration in these circumstances.

SUMMARY OF THE INVENTION

In view of the foregoing, an object of the present invention is to provide a power output apparatus that can generate alternating current power to output the generated alternating current power to an external alternating current load, and that can appropriately obviate current concentration.

Another object of the present invention is to provide a vehicle including a power output apparatus that can generate alternating current power to output the generated alternating current power to an external alternating current load, and that can appropriately obviate current concentration.

According to an aspect of the present invention, a power output apparatus includes first and second motor generators, first and second inverters connected to the first and second motor generators, respectively, and a control device controlling the operation of the first and second inverters such that the first and second motor generators are driven and alternating voltage is generated across neutral points of the first and second motor generators. The control device controls the operation of a corresponding first and/or second inverter, when current required to generate alternating voltage while driving at least one of the first and second motor generators exceeds a predetermined amount, such that torque current of the driven first and/or second motor generator is reduced.

Preferably, the control device controls the operation of a corresponding first and/or second inverter, when current required to generate alternating voltage while driving at least one of the first and second motor generators exceeds a predetermined amount, such that torque current is reduced according to a periodic variation of the alternating voltage.

Preferably, the control device controls the operation of a corresponding first and/or second inverter, when current required to generate alternating voltage while driving at least one of the first and second motor generators exceeds a predetermined amount, such that the torque current is reduced uniformly.

Preferably, the control device reduces, when current required to generate alternating voltage while driving at least one of the first and second motor generators exceeds a predetermined amount, a torque control value of the driven first and/or second motor generator to control the operation of a corresponding first and/or second converter.

Preferably, the first motor generator is linked to an internal combustion engine of a vehicle to start the internal combustion engine and generate power by the driving force of the internal combustion engine. The second motor generator is linked to the driving wheel of the vehicle to drive the driving wheel. The control device controls the operation of the first inverter such that torque current of the first motor generator is reduced when current required to generate alternating voltage while starting the internal combustion engine by the first motor generator exceeds a predetermined amount.

According to another aspect of the present invention, a power output apparatus includes a first motor generator linked to an internal combustion engine of a vehicle to start the internal combustion engine and generate power by the driving force of the internal combustion engine, a second motor generator linked to a driving wheel of the vehicle to drive the driving wheel, first and second inverters connected to the first and second motor generators, respectively, and a control device controlling the operation of the first and second inverters such that the first and second motor generators are driven and alternating voltage is generated across neutral points of the first and second motor generators. The control device controls the operation of first and second inverters such that alternating voltage is generated after the internal combustion engine is started by the first motor generator when the temperature of the internal combustion engine is lower than a predetermined temperature.

Preferably, the control device causes the internal combustion engine to operate continuously when the temperature of the internal combustion engine is lower than the predetermined temperature.

Preferably, the power output apparatus further includes a direct-current power supply supplying power to the first and second inverters, and storing power generated by the first motor generator. The control device controls the operation of the first inverter such that the internal combustion engine is started by the first motor generator according to the state of charge of the direct-current power supply.

Preferably, the control device causes the internal combustion engine to operate continuously when the temperature of the internal combustion engine is lower than the predetermined temperature even if the state of charge of the direct-current power supply exceeds a predetermined amount after the internal combustion engine is started.

According to the present invention, the vehicle includes any of the power output apparatuses set forth above.

The power output apparatus of the present invention can generate alternating voltage to supply the generated alternating voltage to an external load. The control device in the power output apparatus controls the operation of a corresponding first and/or second inverter, when current required to generate alternating voltage while driving at least one of the first and second motor generators exceeds a predetermined amount, such that the torque current of the driven first and/or second motor generator is reduced. Therefore, the current at the first and second inverters can be suppressed within a predetermined amount.

According to the present invention, current concentration at the inverter is obviated to prevent the inverter from being damaged by such current concentration.

The control device in the power output apparatus of the present invention controls the operation of the first and second inverters such that alternating voltage is generated after the internal combustion engine is started by the first motor generator when the temperature of the internal combustion engine is lower than a predetermined temperature. Therefore, the large torque current required to start the internal combustion engine at low temperature and the current required to generate alternating voltage will not flow to the first inverter at the same time.

According to the prevent invention, current concentration at the inverter is obviated to prevent the inverter from being damaged by such current concentration.

The vehicle of the present invention includes a power output apparatus set forth above. The present invention is advantageous in that damage of the inverter by current concentration can be prevented to improve the reliability of the vehicle. Since the present invention is absent of a dedicated inverter to generate alternating voltage, the size, weight, and cost can be reduced while possessing the additional capability of an alternating current power supply.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
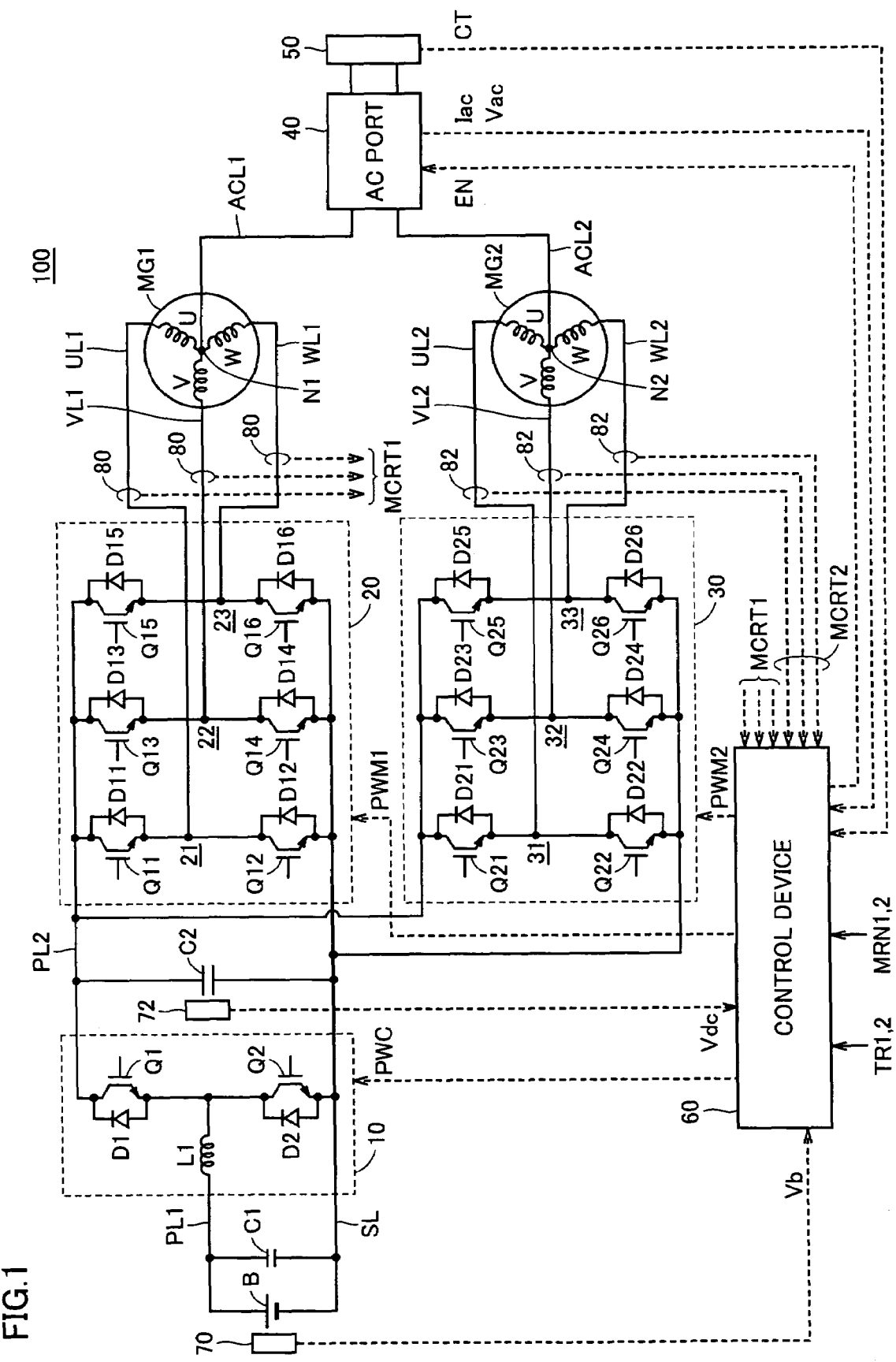
FIG. 1 is a schematic block diagram of a power output apparatus according to a first embodiment of the present invention.

Embodiments of the present invention will be described in detail hereinafter with reference to the drawings. In the drawings, the same or corresponding components have the same reference characters allotted, and description thereof will not be repeated.

First Embodiment

Referring to FIG. 1, a power output apparatus 100 according to a first embodiment of the present invention includes a battery B, an up-converter 10, inverters 20 and 30, motor generators MG1 and MG2, an AC port 40, a connector 50, a control device 60, voltage sensors 70 and 72, current sensors 80 and 82, capacitors C1 and C2, power supply lines PL1 and PL2, a ground line SL, U-phase lines UL1 and UL2, V-phase lines VL1 and VL2, W-phase lines WL1 and WL2, and AC output lines ACL1 and ACL2.

Power output apparatus 100 is incorporated into, for example, a hybrid vehicle. Motor generator MG1 is incorporated into the hybrid vehicle to operate as a power generator linked to and driven by an engine (not shown), and to operate as a motor that can start the engine. Motor generator MG2 is incorporated into the hybrid vehicle as a motor linked to a driving wheel (not shown) of the hybrid vehicle to drive the driving wheel.

Motor generators MG1 and MG2 are formed of a 3-phase alternating synchronous motor. Motor generator MG1 generates alternating voltage using the rotation force from the engine and provides the generated alternating voltage to inverter 20. Motor generator MG1 also generates a driving force by the alternating voltage from inverter 20 to start the engine. Motor generator MG2 generates a driving torque of the vehicle by the alternating voltage from inverter 30. At the time of regenerative braking, motor generator MG2 generates and outputs to inverter 30 alternating voltage.

As will be described afterwards, upon an output request of commercial alternating voltage to an external alternating current load connected to connector 50 when the vehicle system is turned off, alternating voltage is generated across neutral points N1 and N2 of motor generators MG1 and MG2 by inverters 20 and 30. Motor generators MG1 and MG2 output the alternating voltage generated across neutral points N1 and N2 to AC output lines ACL1 and ACL2.

Battery B identified as a direct-current power supply is formed of, for example, a nickel-hydrogen or lithium-ion secondary battery. Battery B outputs the generated direct-current voltage to up-converter 10, and is charged by the direct-current voltage output from up-converter 10.

Up-converter 10 includes a reactor L1, npn transistors Q1 and Q2, and diodes D1 and D2. Reactor L1 has one end connected to a power supply line PL1, and the other end connected to the connection node of npn transistors Q1 and Q2. Npn transistors Q1 and Q2 are connected in series between a power supply line PL2 and a ground line SL to receive a control signal PWC from control device 60 at its base terminal. Diodes D1 and D2 are connected across the collector and emitter of each of npn transistors Q1 and Q2, respectively, so as to conduct current from the emitter side towards the collector side.

Inverter 20 includes a U-phase arm 21, a V-phase arm 22, and a W-phase arm 23. U-phase arm 21, V-phase arm 22 and W-phase arm 23 are connected in parallel between power supply line PL2 and ground line SL. U-phase arm 21 is formed of npn transistors Q11 and Q12 connected in series. V-phase arm 22 is formed of npn transistors Q13 and Q14 connected in series. W-phase arm 23 is formed of npn transistors Q15 and Q16 connected in series. Diodes D11-D16 conducting current from the emitter side to the collector side are connected across the collector and emitter of npn transistors Q11-Q16, respectively.

The connection nodes of respective npn transistors in each phase arm are connected via the U, V, and W-phase lines of UL1, VL1 and WL1 to respective phase coils of motor generator MG1 at an end opposite to the end corresponding to neutral point N1.

Inverter 30 includes a U-phase arm 31, a V-phase arm 32, and a W-phase arm 33, which are connected in parallel between power supply line PL2 and ground line SL. U-phase arm 31 is formed of npn transistors Q21 and Q22 connected in series. V-phase arm 32 is formed of npn transistors Q23 and Q24 connected in series. W-phase arm 33 is formed of npn transistors Q25 and Q26 connected in series. Diodes D21-D26 conducting current from the emitter side towards the collector side are connected across the collector and emitter of npn transistors Q21-Q26, respectively.

In inverter 30, the connection nodes of respective npn transistors in each phase arm are connected via U-phase line UL2, V-phase line VL2 and W-phase line WL2 to respective phase coils of motor generator MG2 at an end opposite to the end corresponding to neutral point N2.

Capacitor C1 is connected between power supply line PL1 and ground line SL to reduce the effect caused by voltage variation on battery B and up-converter 10. Capacitor C2 is connected between power supply line PL2 and ground line SL to reduce the effect caused by voltage variation on inverters 20 and 30 and up-converter 10.

Up-converter 10 responds to control signal PWC from control device 60 to boost the direct-current voltage from battery B by accumulating the current that flows according to the switching operation of npn transistor Q2 as magnetic field energy at reactor L1, and provides the boosted voltage onto power supply line PL2 via diode D1 in synchronization with the OFF timing of npn transistor Q2. Up-converter 10 responds to control signal PWC from control device 60 to down-convert the direct-current voltage from inverter 20 and/or 30 via power supply line PL2 to charge battery B.

Inverter 20 responds to a control signal PWM1 from control device 60 to convert the direct-current voltage supplied from power supply line PL2 into alternating voltage, and provides the alternating voltage to motor generator MG1. In response, motor generator MG1 is driven so as to generate the desired torque. Inverter 20 also responds to control signal PWM1 from control device 60 to convert the alternating voltage generated by motor generator MG1 into direct-current voltage, which is output onto power supply line PL2.

Inverter 30 responds to a control signal PWM2 from control device 60 to convert the direct-current voltage from power supply line PL2 into alternating voltage, which is output to motor generator MG2. In response, motor generator MG2 is driven to generate the desired torque. At the time of regenerative braking by motor generator MG2, inverter 30 responds to control signal PWM2 from control device 60 to convert the alternating voltage from motor generator MG2 into direct-current voltage, which is output onto power supply line PL2.

Upon an output request of alternating voltage towards an external alternating current load connected to connector 50 when the vehicle system is turned off, inverters 20 and 30 generate commercial alternating voltage Vac across neutral points N1 and N2 of motor generators MG1 and MG2. Namely, the potential at neutral point N1 is controlled based on control signal PWM1 from control device 60 such that commercial alternating voltage Vac is generated across neutral points N1 and N2 of motor generators MG1 and MG2 by inverter 20, whereas the potential at neutral point N2 is controlled without generation of a driving force at motor generator MG2 based on control signal PWM2 from control device 60 such that commercial alternating voltage Vac is generated across neutral points N1 and N2 of motor generators MG1 and MG2 by inverter 30.

When starting of the engine linked to motor generator MG1 is requested during generation of commercial alternating voltage Vac, inverter 20 drives motor generator MG1 while limiting the torque of motor generator MG1 based on control signal PWM2 from control device 60. Specifically, when generation of commercial alternating voltage Vac and driving of motor generator MG1 are requested at the same time, inverter 20 will conventionally attain a high load state, leading to the possibility of damage by the excessive heat of the power element caused by current concentration. In consideration of such an event, inverter 20 reduces the torque current of motor generator MG1 while ensuring the current required for generation of commercial alternating voltage Vac, based on control signal PWM2 from control device 60. Accordingly, commercial alternating voltage Vac is ensured while preventing current concentration at inverter 20.

AC port 40 includes a relay establishing connection/disconnection of AC output lines ACL1 and ACL2 with/from connector 50, and a voltage sensor and current sensor (both not shown) to detect commercial alternating voltage Vac and alternating current Iac, respectively. When an output permission instruction EN is received from control device 60, AC port 40 turns ON the relay to electrically connect connector 50 with AC output lines ACL1 and ACL2. AC port 40 also detects commercial alternating voltage Vac and alternating current Iac at AC output lines ACL1 and ACL2 to provide respective detection values to control device 60.

Connector 50 is an output terminal to provide commercial alternating voltage Vac generated across neutral points N1 and N2 of motor generators MG1 and MG2 to an external alternating current load. A plug of an electrical apparatus or a domestic emergency electric power source will be connected to connector 50. Connector 50 provides a signal CT of an H (logical high) level to control device 60 when connected to the plug of an external alternating current load.

Voltage sensor 70 detects battery voltage Vb of battery B, and provides the detected battery voltage Vb to control device 60. Voltage sensor 72 detects the voltage across the terminals of capacitor C2, i.e. input voltage Vdc of inverters 20 and 30 (corresponding to the output voltage of up-converter 10). The detected input voltage Vdc is provided to control device 60. Current sensor 80 detects a motor current MCRT1 of motor generator MG1, which is output to control device 60. Current sensor 82 detects a motor current MCRT2 of motor generator MG2, which is output to control device 60.

Control device 60 generates a control signal PWC to drive up-converter 10, based on torque control values TR1 and TR2 as well as motor revolution counts MRN1 and MRN2 of motor generators MG1 and MG2, respectively, battery voltage Vb of battery B, and input voltage Vdc of inverters 20 and 30. The generated control signal PWC is output to up-converter 10. Revolution counts MRN1 and MRN2 of motor generators MG1 and MG2 are detected by a sensor not shown.

Control device 60 generates control signal PWM1 to drive motor generator MG1, based on input voltage Vdc as well as motor current MCRT1 and torque control value TR1 of motor generator MG1.

Upon an output request of alternating voltage towards an external alternating current load when the vehicle system is turned off, control device 60 generates a control signal PWM1 while controlling the duty summation of npn transistors Q11, Q13 and Q15 of the upper arm and npn transistors Q12, Q14 and Q16 of the lower arm of inverter 20 such that commercial alternating voltage Vac is generated across neutral points N1 and N2 of motor generators MG1 and MG2.

Upon a further request of starting the engine during generation of commercial alternating voltage Vac, control device 60 corrects a torque control value TR1 of motor generator MG1 according to the periodic variation of commercial alternating voltage Vac to alter the torque of motor generator MG1 so as suppress generation of current concentration at inverter 20. Specifically, when the total of alternating current required to generate commercial alternating voltage Vac and the torque current required to start the engine exceeds a predetermined threshold value, control device 60 reduces torque control value TR1 directed to engine starting corresponding to variation in the alternating current required to generate commercial alternating voltage Vac. Control signal PWM1 is generated according to the corrected torque control value. Control device 60 outputs the generated control signal PWM1 to inverter 20.

Control device 60 generates control signal PWM2 to drive motor generator MG2, based on input voltage Vdc as well as motor current MCRT2 and torque control value TR2 of motor generator MG2.

Upon an output request of alternating voltage towards an external alternating current load when the vehicle system is turned off, control device 60 controls the ON duty of npn transistors Q21, Q23 and Q25 of the upper arm and npn transistors Q22, Q24 and Q26 of the lower arm of inverter 30 to generate control signal PWM2 such that commercial alternating voltage Vac is generated across neutral points N1 and N2 of motor generators MG1 and MG2 without generating a driving force at motor generator MG2. Control device 60 outputs the generated control signal PWM2 to inverter 30.

Figure 2:
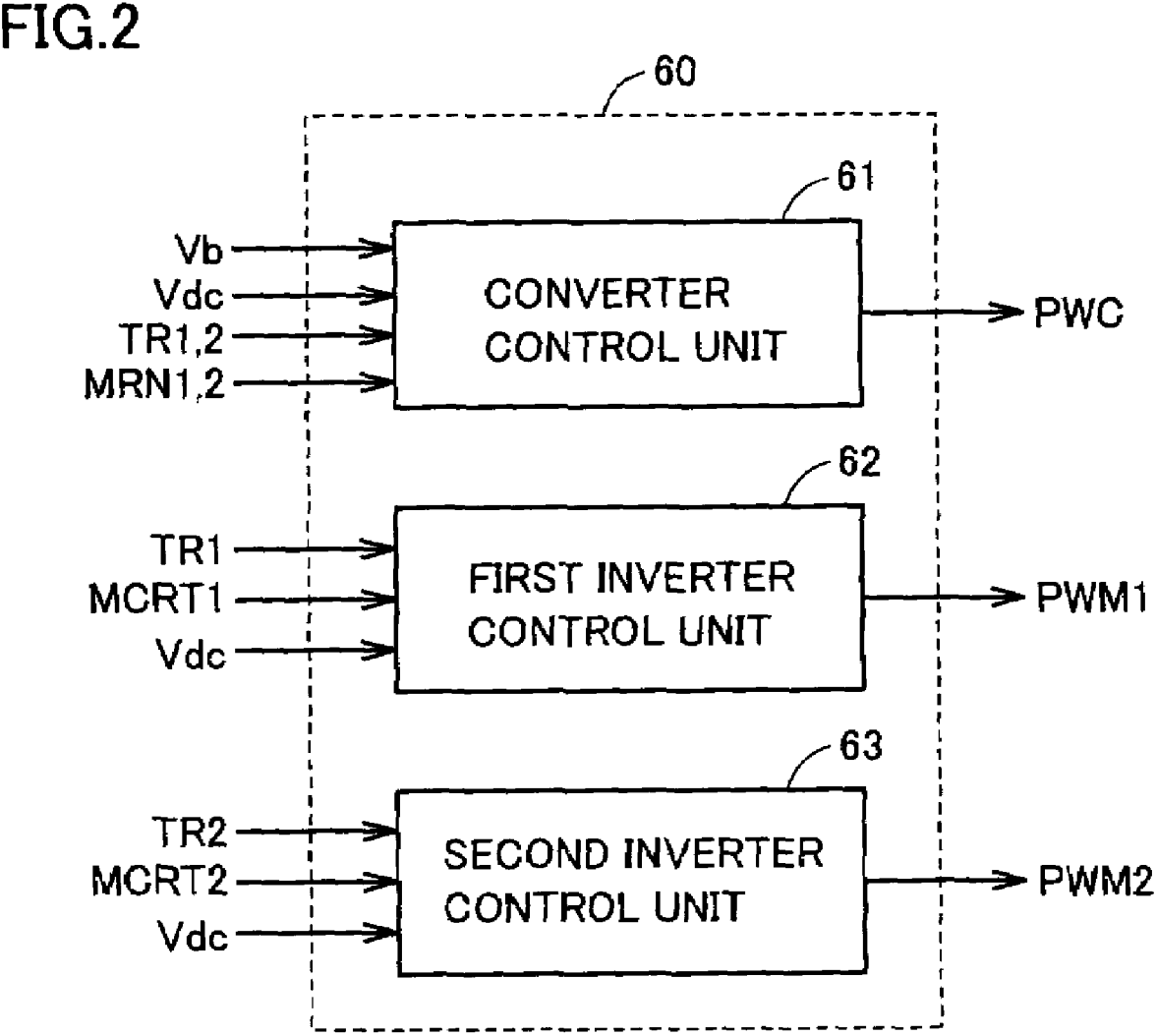
FIG. 2 is a functional block diagram of the control device in FIG. 1.

FIG. 2 is a functional block diagram of control device 60 of FIG. 1. Referring to FIG. 2, control device 60 includes a converter control unit 61, and first and second inverter control units 62 and 63. Converter control unit 61 generates and provides to up-converter 20 a control signal PWC to turn ON/OFF npn transistors Q1 and Q2 of up-converter 10 based on battery voltage Vb of battery B, input voltage Vdc of inverters 20 and 30, torque control values TR1 and TR2, and motor revolution counts MRN1 and MRN2.

First inverter control unit 62 generates a control signal PWM1 to turn ON/OFF npn transistors Q11-Q16 of inverter 20 based on torque control value TR1 and motor current MCRT1 of motor generator MG1, as well as input voltage Vdc.

Second inverter control unit 63 generates a control signal PWM2 to turn ON/OFF npn transistors Q21-Q26 based on torque control value TR2 and motor current MCRT2 of motor generator MG2, as well as input voltage Vdc.

Figure 3:
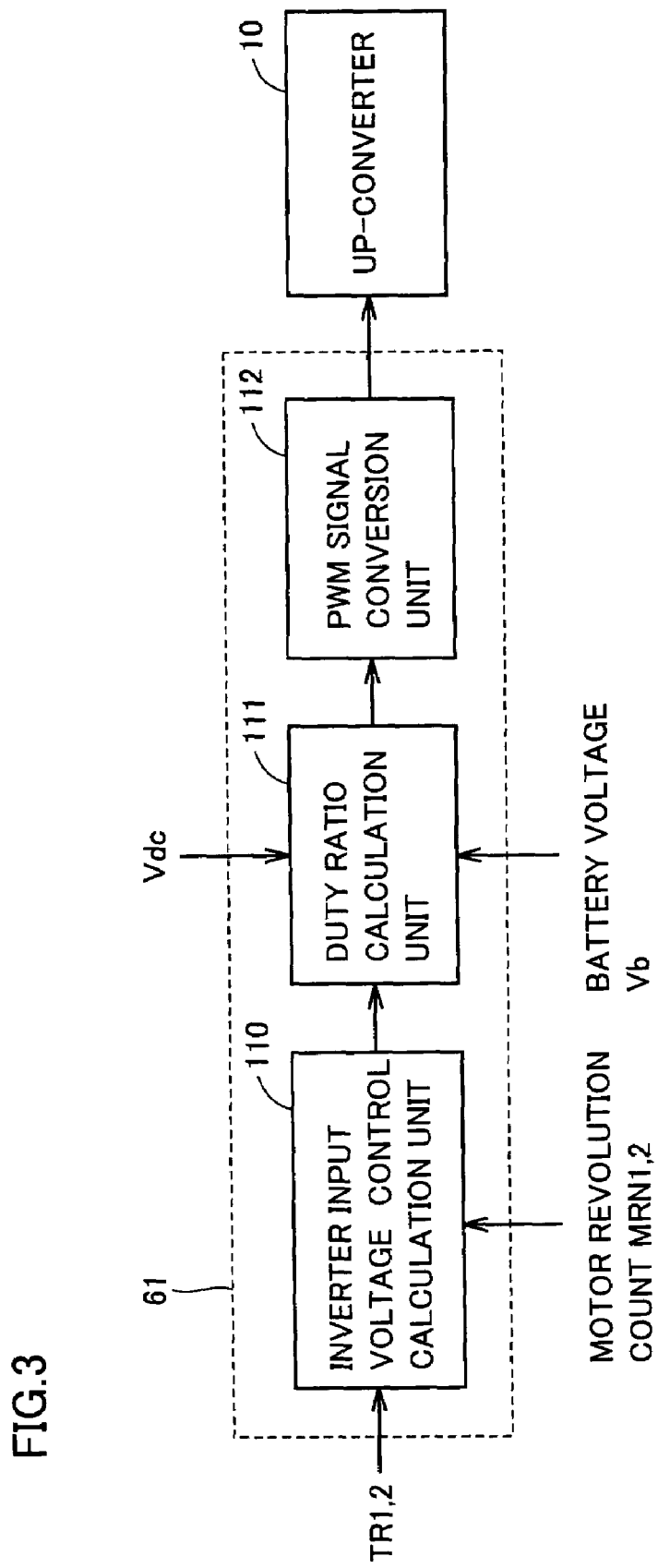
FIG. 3 is a functional block diagram of the converter control unit in FIG. 2.

FIG. 3 is a functional block diagram of converter control unit 61 of FIG. 2. Referring to FIG. 3, converter control unit 61 includes an inverter input voltage control calculation unit 110, a duty ratio calculation unit 111, and a PWM signal conversion unit 112.

Inverter input voltage control calculation unit 110 calculates an optimum value (target value) of the inverter input voltage based on torque control values TR1 and TR2, and motor revolution counts MRN1 and MRN2. The calculated target value is output to duty ratio calculation unit 111.

Duty ratio calculation unit 111 calculates the duty ratio to set input voltage Vdc of inverters 20 and 30 at the target value, based on battery voltage Vb, input voltage Vdc of inverters 20 and 30, and the target value from inverter input voltage control calculation unit 110. The calculated duty ratio is output to PWM signal conversion unit 112.

PWM signal conversion unit 112 generates a control signal PWC to turn ON/OFF of npn transistors Q1 and Q2 of up-converter 10 based on the duty ratio from duty ratio calculation unit 111. The generated control signal PWC is output to npn transistors Q1 and Q2 of up-converter 10.

Figure 4:
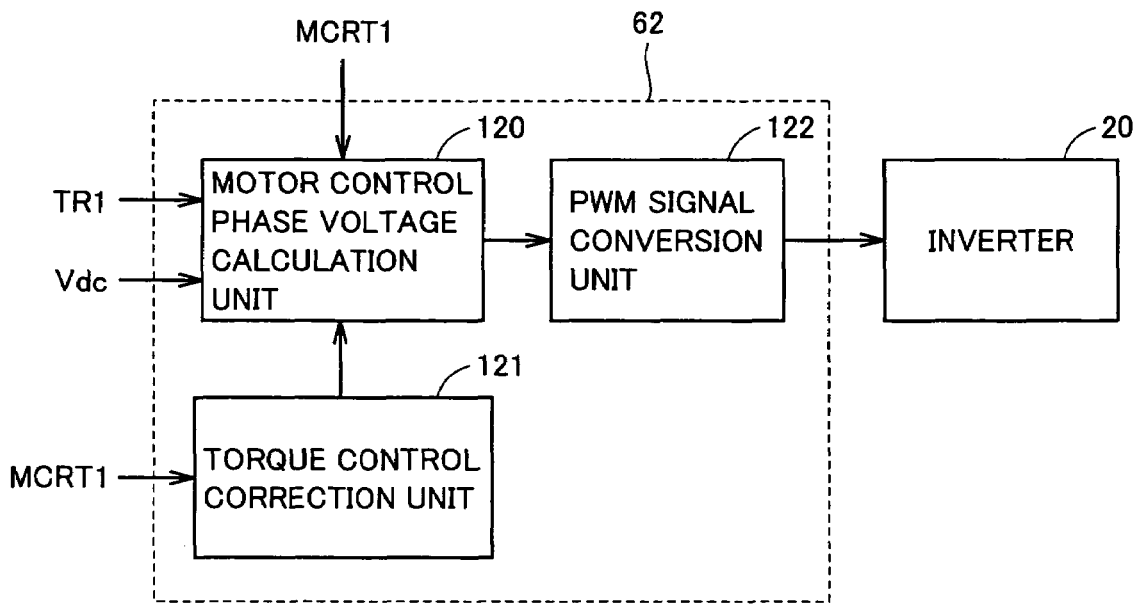
FIG. 4 is a functional block diagram of the first inverter control unit in FIG. 2.

FIG. 4 is a functional block diagram of first inverter control unit 62 of FIG. 2. Referring to FIG. 4, first inverter control unit 62 includes a motor control phase voltage calculation unit 120, a torque control correction unit 121, and a PWM signal conversion unit 122.

Motor control phase voltage calculation unit 120 calculates the voltage to be applied to each phase coil of motor generator MG1 based on torque control value TR1 and motor current MCRT1 of motor generator MG1 as well as input voltage Vdc. The calculated voltage of each phase coil is provided to PWM signal conversion unit 122.

Motor control phase voltage calculation unit 120 receives a correction value of the torque control value from torque control correction unit 121 to correct torque control value TR1 according to the correction value. The voltage of each phase coil of motor generator MG1 is calculated based on the corrected torque control value.

When torque control correction unit 121 receives a detected value of motor current MCRT1 from current sensor 80 and determines that motor current MCRT1 that is the total of the torque current of motor generator MG1 directed to starting the engine linked to motor generator MG1 and the alternating current directed to generating commercial alternating voltage Vac exceeds a predetermined threshold value, a torque control correction value directed to reducing the torque control value of motor generator MG1 is generated according to the periodic variation of commercial alternating voltage Vac in order to set motor current MCRT1 equal to or lower than the threshold value. The generated correction value is output to motor control phase voltage calculation unit 120.

PWM signal conversion unit 122 generates control signal PWM1 to turn ON/OFF npn transistors Q11-Q16 of inverter 20 based on each phase coil voltage from motor control phase voltage calculation unit 120. The generated control signal PWM1 is output to npn transistors Q11-Q16 of inverter 20.

When output of commercial alternating voltage Vac is requested, PWM signal conversion unit 122 generates control signal PWM1 that turns ON/OFF npn transistors Q11-Q16 of inverter 20 while altering the duty summation for switching control at the commercial alternating current frequency (50 Hz or 60 Hz), based on the calculated result from motor control phase voltage calculation unit 120. The generated control signal PWM1 is output to npn transistors Q11-Q16 of inverter 20.

Figure 5:
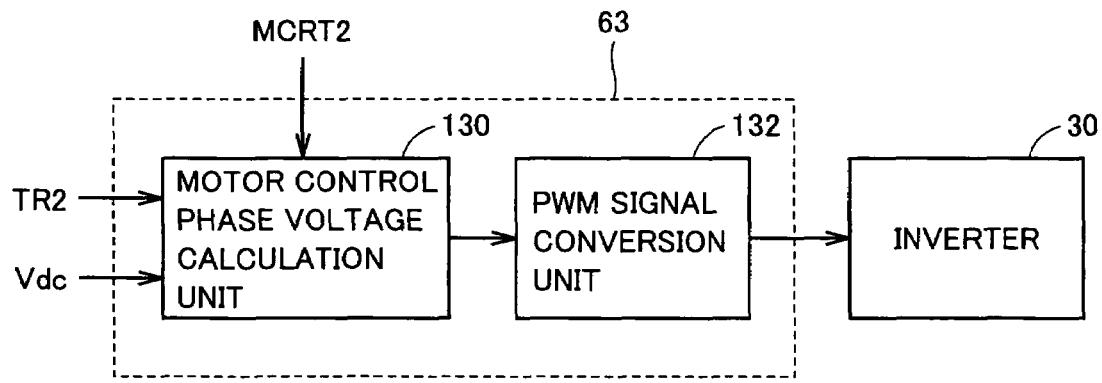
FIG. 5 is a functional block diagram of the second inverter control unit in FIG. 2.

FIG. 5 is a functional block diagram of second inverter control unit 63 in FIG. 2. Referring to FIG. 5, second inverter control unit 63 includes a motor control phase voltage calculation unit 130 and a PWM signal conversion unit 132.

Motor control phase voltage calculation unit 130 calculates the voltage to be applied to each phase coil of motor generator MG2 based on torque control value TR2 and motor current MCRT2 of motor generator MG2 as well as input voltage Vdc. The calculated voltage of each phase coil is output to PWM signal conversion unit 132.

PWM signal conversion unit 132 generates control signal PWM2 directed to turning ON/OFF npn transistors Q21-Q26 of inverter 30 based on the voltage of each phase coil from motor control phase voltage calculation unit 130. The generated control signal PWM2 is output to npn transistors Q21-Q26 of inverter 30.

When output of commercial alternating voltage Vac is requested during a vehicle turn-off state, PWM signal conversion unit 132 generates control signal PWM2 to turn ON/OFF npn transistors Q21-Q26 of inverter 30 such that alternating current of the same phase at the commercial alternating frequency is conducted to U-phase arm 31, V-phase arm, 32 and W-phase arm 33 of inverter 30, based on the calculated result from motor control phase voltage calculation unit 130. The generated control signal PWM2 is output to npn transistors Q21-Q26 of inverter 30.

Figure 6:
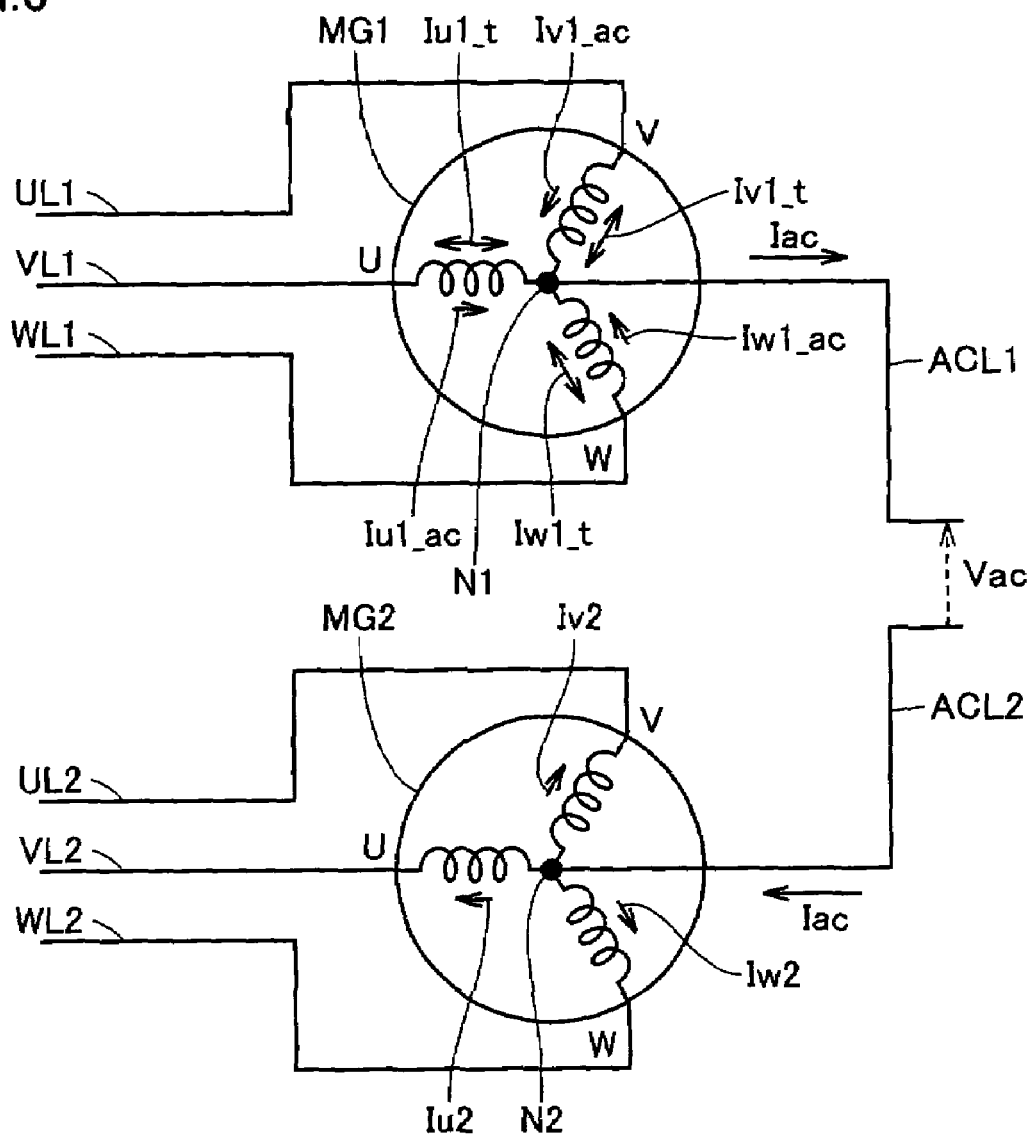
FIG. 6 is a diagram to describe current conducted to the motor generator to generate commercial alternating voltage across neutral points of the motor generators in FIG. 1.

FIG. 6 is a diagram to describe the current conducted to motor generators MG1 and MG2 to generate commercial alternating voltage Vac across neutral points N1 and N2 of motor generators MG1 and MG2 of FIG. 1. FIG. 6 represents the current flow when the vehicle system is turned off and engine starting by motor generator MG1 is effected at the same time as the generation of commercial alternating voltage Vac. FIG. 6 corresponds to the case where alternating current Iac is conducted from neutral point N1 of motor generator MG1 towards neutral point N2 of motor generator MG2.

Referring to FIG. 6, inverter 20 (not shown) connected to the U, V and W-phase lines of UL1, VL1 and WL1 is switched based on control signal PWM1 from control device 60 (not shown) to conduct U-phase current formed of current components Iu1_t and Iu1_ac to the U-phase coil of motor generator MG1, the V-phase current formed of current components Iv1_t and Iv1_ac to the V-phase coil of motor generator MG1, and the W-phase current formed of current components Iw1_t and Iw1_ac to the W-phase coil of motor generator MG1.

Inverter 30 (not shown) connected to the U, V and W-phase lines of UL2, VL2 and WL2 is switched based on control signal PWM2 from control device 60 to conduct U-phase current Iu2, V-phase current Iv2, and W-phase current Iw2 to the U, V and W-phase coils, respectively, of motor generator MG2.

As used herein, current components Iu1_t, Iv1_t and Iw1_t correspond to the current to cause motor generator MG1 to generate the engine starting torque. Current components Iu1_ac, Iv1_ac and Iw1_ac correspond to the current to conduct alternating current Iac from neutral point N1 of motor generator MG1 towards AC output line ACL1. U-phase current Iu2, V-phase current Iv2 and W-phase current Iw2 are currents to conduct alternating current Iac from AC output line ACL2 to neutral point N2 of motor generator MG2. Current components Iu1_ac, Iv1_ac, Iw1_ac and the U, V and W phase currents of Iu2, Iv2, Iw2 are equal to each other in level, and do not contribute to the torque of motor generators MG1 and MG2. The total value of current components Iu1_ac, Iv1_ac, and Iw1_ac and the total value of the U, V and W-phase currents of Iu2, Iv2 and Iw2 each become alternating current Iac.

Figure 7:
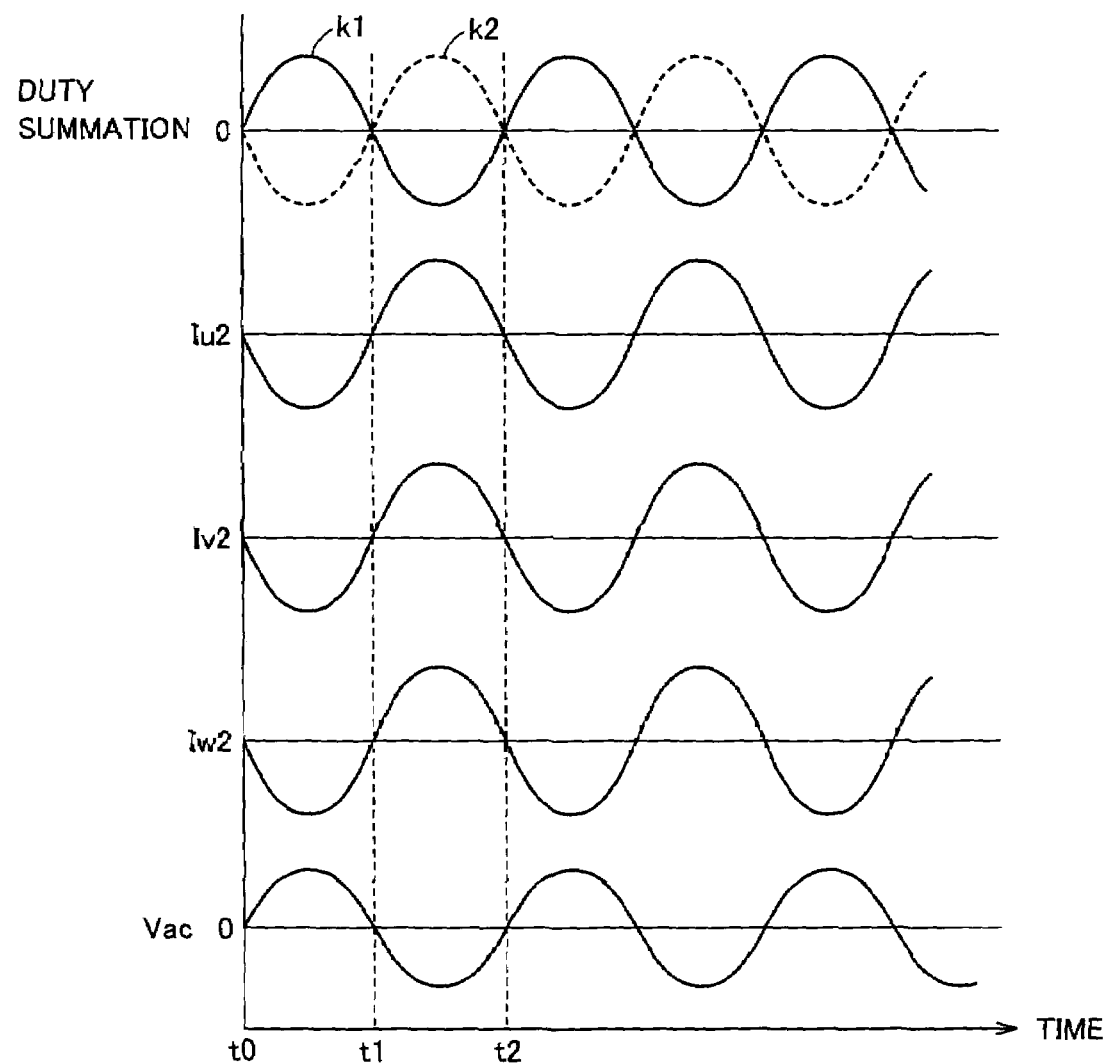
FIG. 7 is a waveform diagram of duty summation during generation of commercial alternating voltage and generated commercial alternating voltage.

FIG. 7 is a waveform diagram of the duty summation during generation of commercial alternating voltage Vac and generated commercial alternating voltage Vac. In FIG. 7, curve k1 represents the change in the duty summation during switching control of inverter 20, whereas curve k2 represents the change in the duty summation during switching control of inverter 30. As used herein, "duty summation" is the value of subtracting the ON duty of the lower arm from the ON duty of the upper arm in each inverter. In FIG. 7, a positive duty summation indicates that the potential at the neutral point of the corresponding motor generator is higher than an intermediate voltage Vdc/2 of inverter input voltage Vdc, whereas a negative duty summation indicates that the neutral point potential is lower than intermediate voltage Vdc/2.

In power output apparatus 100, control device 60 alters the duty summation of inverter 20 periodically at the commercial alternating frequency according to curve k1. Further, control device 60 controls the switching of inverter 30 such that currents Iu2, Iv2 and Iw2 of respective U, V and W phases of equal phase at the commercial alternating frequency are conducted to motor generator MG2 and the duty summation of inverter 30 follows curve k2.

The duty summation of inverter 30 can be altered periodically by a phase that is an inverted version of the phase by which the duty summation of inverter 20 is altered. Since inverter 30 conducts currents Iu2, Iv2 and Iw2 of respective U, V and W phases at the same phase to motor generator MG2, control device 60 controls inverter 30 such that, when the duty summation is positive, the lower arm of each phase arm in inverter 30 is OFF and the ON duty of the upper arm is controlled according to curve k2, and when the duty summation is negative, the upper arm of each phase arm in inverter 30 is OFF and the ON duty of the lower arm is controlled according to curve k2.

Thus, the potential at neutral point N1 becomes higher than voltage Vdc/2 whereas the potential at neutral point N2 becomes lower than voltage Vdc/2 to result in positive commercial alternating voltage Vac across neutral points N1 and N2 during time t0-t1. When an external alternating load is connected to connector 50, the extra current that cannot flow from the upper arm to the lower arm of inverter 20 flows from neutral point N1 to neutral point N2 via AC output line ACL1, the external alternating current load and AC output line ACL2, and then from neutral point N2 to the lower arm of each phase arm in inverter 30.

During time t1-t2, the potential at neutral point N1 becomes lower than voltage Vdc/2 whereas the potential at neutral point N2 becomes higher than voltage Vdc/2 to result in negative commercial alternating voltage Vac across neutral points N1 and N2. Accordingly, current flows from the upper arm in each phase arm of inverter 30 towards neutral point N1 via neutral point N2, AC output line ACL2, the external alternating current load, and AC output line ACL1, and then from neutral point N1 to the lower arm of inverter 20.

Figure 8:
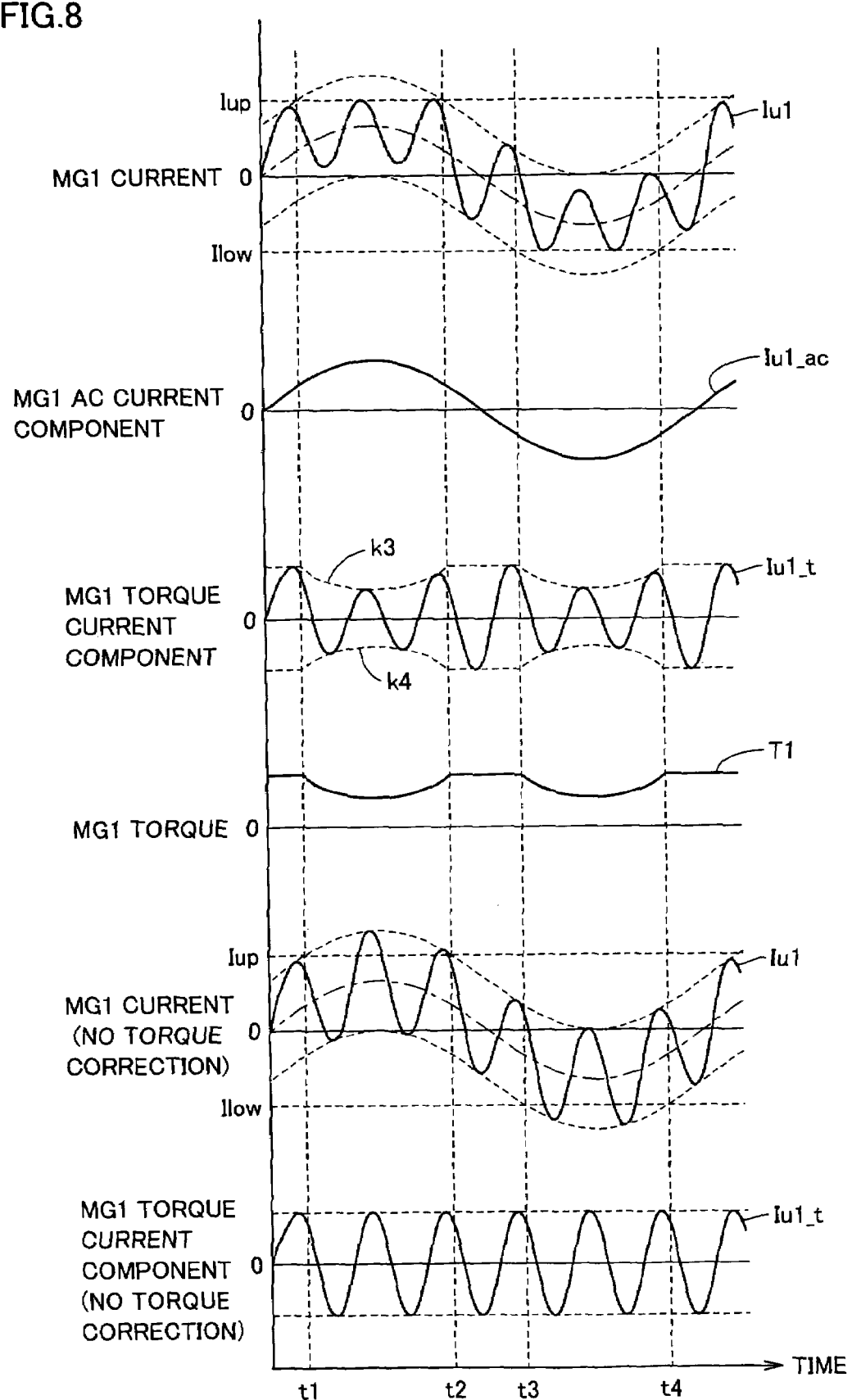
FIG. 8 is a waveform diagram of the current and torque at a motor generator MG1 in FIG. 1.

Thus, inverters 20 and 30 can cause generation of commercial alternating voltage Vac across neutral points N1 and N2 of motor generators MG1 and MG2 without generation of a driving force from motor generator MG2 while controlling the drive of motor generator MG1, FIG. 8 is a waveform diagram of the current and torque at motor generator MG1 of FIG. 1. The waveform of FIG. 8 corresponds to the case where starting of the engine connected to motor generator MG1 is requested during generation of commercial alternating voltage Vac. The U-phase current is indicated representative of the current at motor generator MG1.

Referring to FIG. 8, current Iu1 represents the U-phase current of motor generator MG1. Specifically, current Iu1 corresponds to the total of U-phase current component Iu1_ac to conduct alternating current Iac across neutral points N1 and N2 of motor generators MG1 and MG2 and the U-phase current component Iu1_t to generate torque T1 at motor generator MG1.

To prevent current concentration at inverter 20, current Iu1 must be set within the range of an upper limit value Iup and a lower limit value Ilow. At time t1 when current Iu1 will exceed upper limit Iup due to the increase of current component Iu1_ac, control device 60 corrects the torque control value of motor generator MG1 so as to reduce the torque of motor generator MG1. Control signal PWM1 calculated based on the corrected torque control value is output to inverter 20.

Inverter 20 responds to control signal PWM1 from control device 60 to reduce current component Iu1_t directed to generating the torque. As a result, current Iu1 will not exceed upper limit Iup, and current concentration at inverter 20 is obviated.

Then, control device 60 corrects the torque control value of motor generator MG1 such that current component Iu1_t is set within the range of envelops k3 and k4 according to variation in current component Iu1_ac. At time t2, control device 60 sets the correction of the torque control value to 0.

At time t3 when current Iu1 will become lower than lower limit Ilow due to the negative increase of current component Iu1_ac, control device 60 corrects the torque control value again so as to reduce the torque of motor generator MG1. Control signal PWM1 calculated based on the corrected torque control value is output to inverter 20.

Inverter 20 reduces current component Iu1_t directed to generating the torque based on control signal PWM1 from control device 60. As a result, current Iu1 will not become lower than lower limit Ilow, and current concentration at inverter 20 is obviated.

Then, control device 60 corrects the torque control value of motor generator MG1 such that current component Iu1_t is set within the range of envelops k3 and k4 according to variation in current component Iu1_ac. At time t4, control device 60 sets the correction of torque control value to 0.

If the torque is not corrected by control device 60, current Iu1 will exceed upper limit Iup and lower limit Ilow at time t1-t2 and time t3-t4 where the absolute value of current component Iu1_ac is increased.

In the case where engine starting by motor generator MG1 and generation of commercial alternating voltage Vac are requested at the same time, the torque control value of motor generator MG1 required to start the engine is reduced according to the periodic variation of commercial alternating voltage Vac in accordance with the first embodiment, whereby the torque current of motor generator MG1 is suppressed. As a result, the total current conducted to motor generator MG1 from inverter 20 is suppressed. Thus, current concentration at inverter 20 is obviated, preventing inverter 20 from being damaged by such current concentration.

Although torque correction by control device 60 is conducted according to periodic variation of commercial alternating voltage Vac, the torque may be corrected so as to reduce the torque current of motor generator MG1 uniformly. In this case, control of torque correction can be simplified since it is not necessary to alter the torque of motor generator MG1 according to the commercial alternating voltage Vac cycle.

Although the above description is based on the case where commercial alternating voltage Vac is output to an external alternating current load when the vehicle system is turned off, current concentration at inverter 30 can be obviated in a similar manner even in the case where commercial alternating voltage Vac is supplied to an alternating current load such as an electrical equipment connected to connector 50 during a running state of the vehicle. Specifically, in the case where generation of a driving force by motor generator MG2 and generation of commercial alternating voltage Vac are requested at the same time, the total current conducted from inverter 30 to motor generator MG2 can be suppressed by reducing the torque control value of motor generator MG2. It is to be noted that the driving force of the vehicle generated by motor generator MG2 will be reduced in such a case.

Furthermore, current concentration at inverters 20 and 30 can be obviated in a similar manner even in the case where the engine is to be started by motor generator MG1 during the supply of commercial alternating voltage Vac to an alternating current load in a running state of the vehicle, i.e. even when generation of a driving force by motor generators MG1 and MG2 and generation of commercial alternating voltage Vac are requested at the same time.

Second Embodiment

Figure 9:
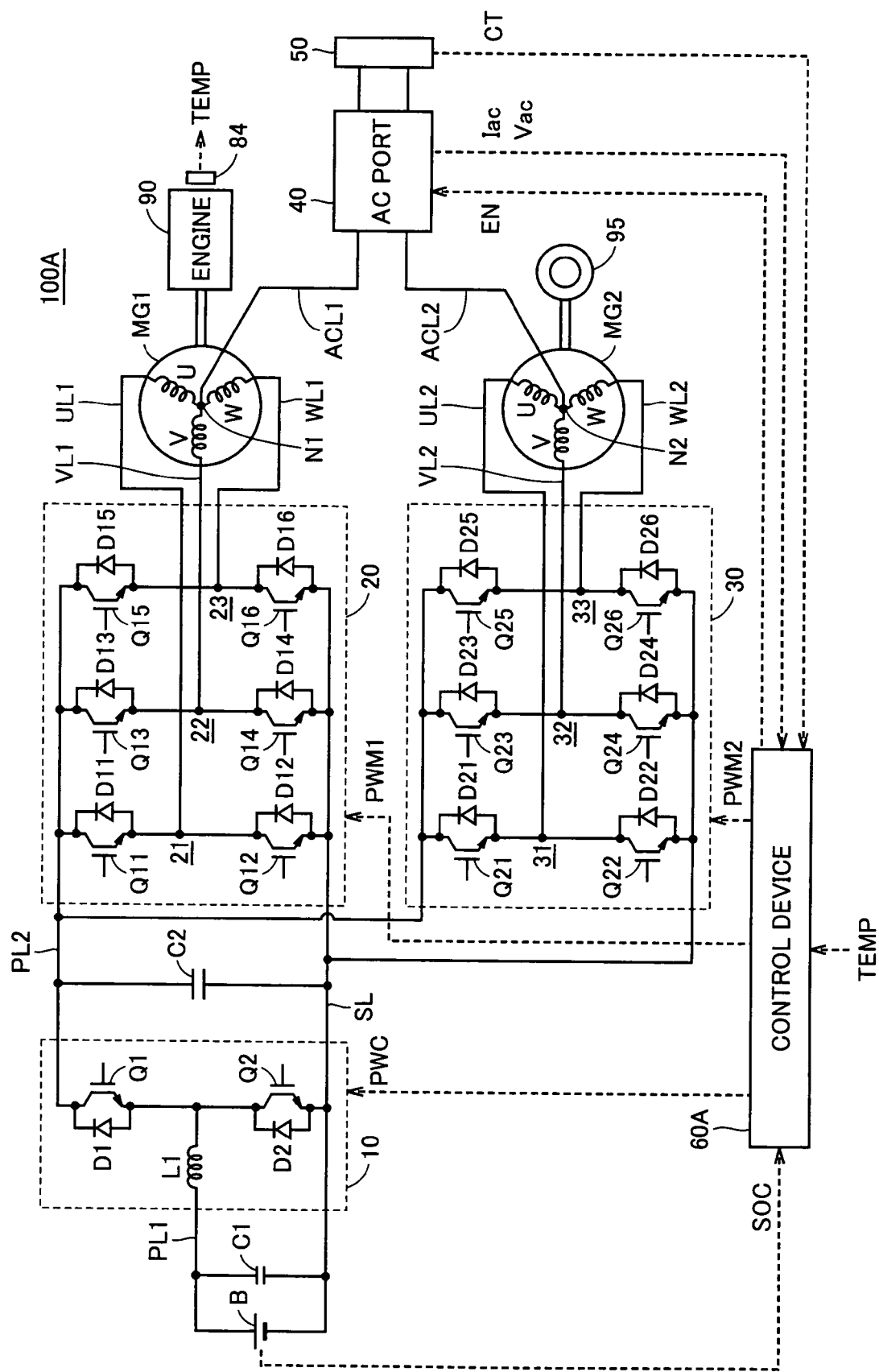
FIG. 9 is a schematic block diagram of a power output apparatus according to a second embodiment of the present invention.

FIG. 9 is schematic block diagram of a power output apparatus 100A according to a second embodiment of the present invention. For the sake of description, voltage sensors 70 and 72 and current sensors 80 and 82 shown in FIG. 1 are not depicted in FIG. 9.

Referring to FIG. 9, power output apparatus 100A further includes, based on the configuration of power output apparatus 100 according to the first embodiment shown in FIG. 1, a temperature sensor 84, and a control device 60A instead of control device 60. Temperature sensor 84 detects the engine temperature TEMP of engine 90 connected to motor generator MG1. The detected engine temperature TEMP is output to control device 60A.

Control device 60A receives engine temperature TEMP of engine 90 from temperature sensor 84, and receives the SOC (State of Charge) of battery B from battery B. Control device 60A controls the start/stop of engine 90 taking into consideration engine temperature TEMP of engine 90 when generation of commercial alternating voltage Vac and starting of engine 90 are requested at the same time.

Specifically, engine 90 requires a large torque for starting since the cranking motion resistance becomes higher by the increase of the oil viscosity in a low temperature state. As such, when the temperature of engine 90 is low, control device 60A effects control such that engine 90 is started prior to generation of commercial alternating voltage Vac, and then generates commercial alternating voltage Vac only after engine 90 has been started. It is to be noted that even if the SOC of battery B is sufficient after the starting of engine 90, a large torque will be required to restart engine 90 from a turn-off state if the temperature of engine 90 is still too low. Therefore, control device 60A effects control such that engine 90 will not be stop until the temperature of engine 90 is high enough, even if the SOC of battery B is sufficient.

Although the regenerative current from motor generator MG1 and the current required to generate commercial alternating voltage Vac flow to inverter 20 when commercial alternating voltage Vac is generated following starting of engine 90, the flowing amount thereof is not of a level that will damage inverter 20.

Figure 10:
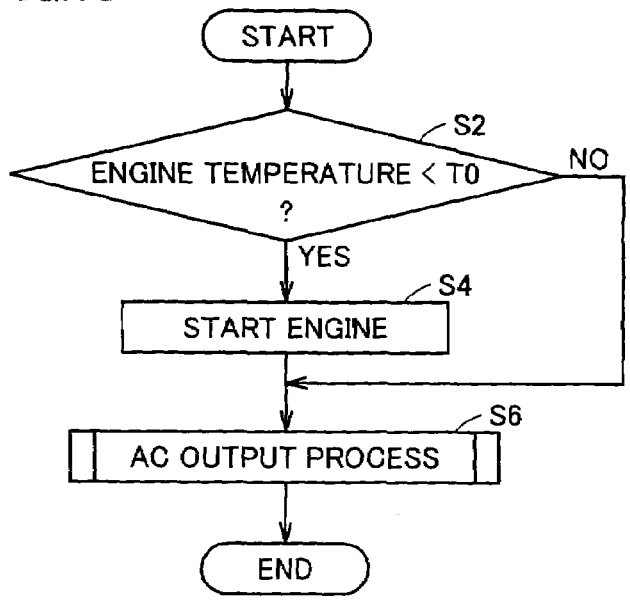
FIG. 10 is an operation flow chart in a commercial alternating voltage generation mode of the power output apparatus of the second embodiment.

FIG. 10 is an operation flow chart in a commercial alternating voltage Vac generation mode of power output apparatus 100A according to a second embodiment of the present invention. Referring to FIG. 10, control device 60A determines whether engine temperature TEMP of engine 90 from temperature sensor 84 is lower than a predetermined threshold value T0 (step S2). When determination is made that engine temperature TEMP is equal to or higher than threshold value T0 by control device 60 (NO at step S2), control proceeds to step S6.

In contrast, when determination is made that engine temperature TEMP is lower than threshold value T0 by control device 60A (YES at step S2), inverter 20 is controlled such that engine 90 is started by motor generator MG1 prior to generation of commercial alternating voltage Vac since a large torque will be required to start engine 90, leading to occurrence of current concentration at inverter 20 (step S4). Upon operation of engine 90, control device 60A carries out an AC output process to generate commercial alternating voltage Vac and provide the generated commercial alternating voltage Vac to an external alternating current load (step S6).

Figure 11:
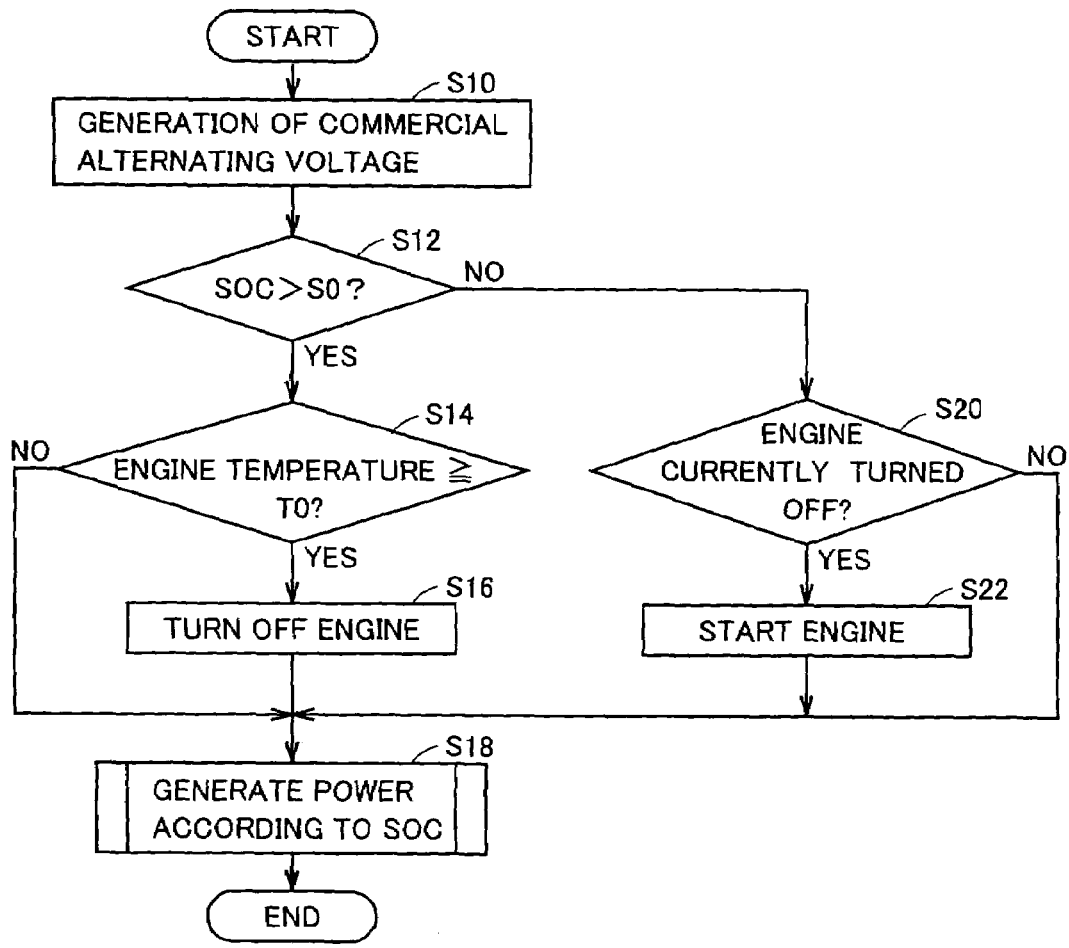
FIG. 11 is a flow chart of an AC output process of FIG. 10.

FIG. 11 is a flow chart of the AC output process of FIG. 10. Referring to FIG. 11, control device 60A control inverters 20 and 30 such that commercial alternating voltage Vac is generated across neutral points N1 and N2 of motor generators MG1 and MG2 (step S10). Then, control device 60A determines whether the SOC of battery B received from battery B is greater than a predetermined threshold value S0 (step S12).

When determination is made that the SOC of battery B is larger than the threshold value S0 by control device 60A at step S12 (YES at step S12), further determination is made whether engine temperature TEMP of engine 90 from temperature sensor 84 is equal to or higher than threshold value T0 (step S14). When determination is made that engine temperature TEMP is at least threshold value T0 by control device 60A (YES at step S14), engine 90 is turned off (step S16). Then, control device 60A controls the power generation by motor generator MG1 according to the SOC of battery B (step S18).

When determination is made that engine temperature TEMP is lower than threshold value T0 by control device 60A at step S14 (NO at step S14), control proceeds to step S18 without turning off engine 90.

Namely, when control device 60A determines that the SOC of battery B is sufficient and the temperature of engine 90 has rose to a certain level, engine 90 is turned off. When determination is made that the temperature of engine 90 is still low although the SOC of battery B is sufficient, engine 90 is not turned off since a large torque will be required to restart the engine 90 when turned off.

When determination is made that the SOC of battery B is lower than threshold value S0 by control device 60A at step S12 (NO at step S12), confirmation is made as to whether engine 90 is turned off or not (step S20). When engine 90 is turned off (YES at step S20), control device 60A controls inverter 20 such that engine 90 is started by motor generator MG1 (step S22). Then, control device 60A proceeds to step S18. When engine 90 is operating at step S20 (NO at step S20), control device 60A proceeds to step S18.

When starting of engine 90 by motor generator MG1 and generation of commercial alternating voltage Vac are requested at the same time in accordance with the second embodiment, engine 90 is started prior to generation of commercial alternating voltage Vac, and commercial alternating voltage Vac is generated subsequently since a large torque current will be required to start engine 90 when engine 90 is at a low temperature.

Therefore, a large torque current required to start engine 90 at a low temperature and the current required to generate commercial alternating voltage Vac will not be requested at the same time, so that current concentration at inverter 20 can be obviated.

Even if the SOC of battery. B is sufficient after engine 90 has been started in the second embodiment, engine 90 is not turned off until engine temperature TEMP exceeds the predetermined temperature since a large torque current will be required to start engine 90 again when turned off if engine 90 is at a low temperature.

Thus, the event of a large torque current required to restart engine 90 at a low temperature and current required to generate commercial alternating voltage Vac both being requested at the same time will not occur, obviating current concentration at inverter 20.

A hybrid vehicle into which a power output apparatus 100/100A of the first and second embodiments is incorporated can be used as an AC power supply of 100V. Absence of a dedicated inverter to generate commercial alternating voltage Vac in a hybrid vehicle may offer the advantage of reducing the size, weight, cost, and the like for a vehicle.

It will be understood that incorporation of power output apparatus 100/100A into a hybrid vehicle is merely exemplary, and power output apparatus 100/100A of the present invention is also applicable to an electric vehicle or a fuel cell electric vehicle. The present invention is generally applicable to an apparatus that employs two motor generators. In the case where power output apparatus 100/100A is incorporated into an electric vehicle or a fuel cell electric vehicle, motor generators MG1 and MG2 are linked to the driving wheel of the electric vehicle or fuel cell electric vehicle.

In the above description, motor generator MG1 and motor generator MG2 correspond to "first motor generator" and "second motor generator", respectively. Inverter 20 and inverter 30 correspond to "first inverter" and "second inverter", respectively. Battery B corresponds to "direct-current power supply".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power output apparatus comprising:
   first and second motor generators,
   first and second inverters connected to said first and second motor generators, respectively, and
   a control device controlling an operation of said first and second inverters such that said first and second motor generators are driven, and alternating voltage is generated across neutral points of said first and second motor generators, wherein said control device controls the operation of a corresponding said first and/or second inverter, when current required to generate said alternating voltage while driving at least one of said first and second motor generators exceeds a predetermined amount, such that torque current of the driven said first and/or second motor generator is reduced; and
   an output terminal providing said alternating voltage that is adjusted and generated across said neutral points to an alternating current load external to said power output apparatus.

2. The power output apparatus according to claim 1, wherein said control device controls the operation of said corresponding first and/or second inverter, when current required to generate said alternating voltage while driving at least one of said first and second motor generators exceeds said predetermined amount, such that said torque current is reduced according to periodic variation of said alternating voltage.

3. The power output apparatus according to claim 1, wherein said control device controls the operation of said corresponding first and/or second inverter, when current required to generate said alternating voltage while driving at least one of said first and second motor generators exceeds said predetermined amount, such that said torque current is reduced uniformly.

4. The power output apparatus according to claim 1, wherein said control device reduces, when current required to generate said alternating voltage while driving at least one of said first and second motor generators exceeds said predetermined amount, a torque control value of said driven first and/or second motor generator to control the operation of said corresponding first and/or second inverter.

5. The power output apparatus according to claim 1, wherein
said first motor generator is linked to an internal combustion engine of a vehicle to start said internal combustion engine and generate power by a driving force of said internal combustion engine,
said second motor generator is linked to a driving wheel of said vehicle to drive said driving wheel, and
said control device controls the operation of said first inverter, when current required to generate said alternating voltage while starting said internal combustion engine by said first motor generator exceeds said predetermined amount, such that torque current of said first motor generator is reduced.

6. A power output apparatus comprising:
a first motor generator linked to an internal combustion engine of a vehicle to start said internal combustion engine and generate power by a driving force of said internal combustion engine,
a second motor generator linked to a driving wheel of said vehicle to drive said driving wheel,
first and second inverters connected to said first and second motor generators, respectively, and
a control device controlling an operation of said first and second inverters such that said first and second motor generators are driven, and alternating voltage is generated across neutral points of said first and second motor generators, wherein said control device controls an operation of said first and second inverters, when a temperature of said internal combustion engine is lower than a predetermined temperature, such that said alternating voltage is generated subsequent to starting of said internal combustion engine by said first motor generator; and
an output terminal providing said alternating voltage that is adjusted and generated across said neutral points to an alternating current load external to said power output apparatus.

7. The power output apparatus according to claim 6, wherein said control device causes said internal combustion engine to operate continuously when the temperature of said internal combustion engine is lower than said predetermined temperature.

8. The power output apparatus according to claim 6, further comprising a direct-current power supply supplying power to said first and second inverters, and storing power generated by said first motor generator,
wherein said control device controls an operation of said first inverter such that said internal combustion engine is started by said first motor generator according to a state of charge of said direct-current power supply.

9. The power output apparatus according to claim 8, wherein said control device causes said internal combustion engine to operate continuously when the temperature of said internal combustion engine is lower than said predetermined temperature even if the state of charge of said direct-current power supply exceeds a predetermined amount after said internal combustion engine is started.

10. A vehicle including a power output apparatus comprising:
first and second motor generators,
first and second inverters connected to said first and second motor generators, respectively, and
a control device controlling an operation of said first and second inverters such that said first and second motor generators are driven, and alternating voltage is generated across neutral points of said first and second motor generators,
wherein said control device controls the operation of a corresponding said first and/or second inverter, when current required to generate said alternating voltage while driving at least one of said first and second motor generators exceeds a predetermined amount, such that torque current of the driven said first and/or second motor generator is reduced,
said first motor generator is linked to an internal combustion engine of a vehicle to start said internal combustion engine and generate power by a driving force of said internal combustion engine,
said second motor generator is linked to a driving wheel of said vehicle to drive said driving wheel, and
said control device controls the operation of said first inverter, when current required to generate said alternating voltage while starting said internal combustion engine by said first motor generator exceeds said predetermined amount, such that torque current of said first motor generator is reduced.

* * * * *